US012802881B2

(12) United States Patent
(10) Patent No.: US 12,802,881 B2
(45) Date of Patent: Nov. 17, 2026

Kim et al.

(54) CAPACITOR AND MANUFACTURING METHOD THEREOF

(71) Applicant: SAMSUNG ELECTRO-MECHANICS CO., LTD., Suwon-si (KR)

(72) Inventors: Jaehoon Kim, Suwon-si (KR); Jungsub Choi, Suwon-si (KR); Jung-Sun Kwon, Suwon-si (KR); Gyoungheon Ko, Suwon-si (KR); Jino Yoo, Suwon-si (KR); Younghyu Ahn, Suwon-si (KR); Yongmook Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 190 days.

(21) Appl. No.: 18/777,112

(22) Filed: Jul. 18, 2024

(65) Prior Publication Data

US 2025/0140476 A1 May 1, 2025

(30) Foreign Application Priority Data

Nov. 1, 2023 (KR) ........................ 10-2023-0148917
Jul. 8, 2024 (KR) ........................ 10-2024-0089605

(51) Int. Cl.
*H01G 4/08* (2006.01)
*H01G 4/232* (2006.01)
(Continued)

(52) U.S. Cl.
CPC ........... *H01G 4/085* (2013.01); *H01G 4/2325* (2013.01); *H01G 4/236* (2013.01); *H01G 4/33* (2013.01)

(58) Field of Classification Search
CPC ...... H01G 4/085; H01G 4/2325; H01G 4/236; H01G 4/33
See application file for complete search history.

(56) References Cited

U.S. PATENT DOCUMENTS

2003/0213989 A1* 11/2003 Delpech ................. H10D 1/043
257/532
2007/0145599 A1 6/2007 Kim
(Continued)

FOREIGN PATENT DOCUMENTS

CN 113690370 A 11/2021
CN 116347972 A * 6/2023 ............... H10D 1/68
(Continued)

OTHER PUBLICATIONS

CN-116347972-A Translation (Year: 2023).*
The Extended European Search Report dated Mar. 24, 2025 issued in European Patent Application No. 24203214.2.

*Primary Examiner* — Nathan Milakovich
(74) *Attorney, Agent, or Firm* — Morgan, Lewis & Bockius LLP

(57) ABSTRACT

An embodiment provides a capacitor including: a body including a substrate and a capacitive portion disposed on the substrate, and a first external electrode and a second external electrode disposed on the body and having a plate-shaped structure. The capacitive portion includes an insulating layer with a plurality of trenches, a first internal electrode disposed on the insulating layer and electrically connected to the first external electrode, a dielectric layer disposed on the first internal electrode, and a second internal electrode disposed on the dielectric layer and electrically connected to the second external electrode.

20 Claims, 14 Drawing Sheets

II-II'

(51) Int. Cl.
*H01G 4/236* (2006.01)
*H01G 4/33* (2006.01)

(56) References Cited

U.S. PATENT DOCUMENTS

| | | | | |
|---|---|---|---|---|
| 2015/0124371 | A1 | 5/2015 | Park et al. | |
| 2018/0308638 | A1* | 10/2018 | Ryou | H01G 4/33 |
| 2019/0027312 | A1 | 1/2019 | Muramatsu et al. | |
| 2020/0043931 | A1 | 2/2020 | Sato et al. | |
| 2023/0096227 | A1 | 3/2023 | Kim et al. | |
| 2025/0062075 | A1 | 2/2025 | Park et al. | |
| 2025/0210256 | A1* | 6/2025 | Park | H10D 1/716 |

FOREIGN PATENT DOCUMENTS

| | | | |
|---|---|---|---|
| EP | 4510189 | A1 | 2/2025 |
| KR | 10-0741874 | B1 | 7/2007 |
| KR | 10-1933419 | B1 | 12/2018 |
| KR | 10-2077617 | B1 | 2/2020 |
| WO | 2018/138604 | A1 | 8/2018 |

* cited by examiner

CAPACITOR AND MANUFACTURING METHOD THEREOF

CROSS-REFERENCE TO RELATED APPLICATION

This application claims priority to and the benefit of Korean Patent Application Nos. 10-2023-0148917 filed on Nov. 1, 2023 and 10-2024-0089605 filed on Jul. 8, 2024 in the Korean Intellectual Property Office, the entire contents of which are incorporated herein by reference.

TECHNICAL FIELD

The present disclosure relates to a capacitor and a manufacturing method thereof.

BACKGROUND

As electronic devices such as smartphones and wearable devices become smaller, new technologies that may maximize the capacity of capacitors in the same volume are being developed.

Theoretically, there are three methods to increase the capacity: using a material with a high dielectric constant (high-k) as a dielectric, increasing an area where electrodes face each other, or reducing a thickness of a dielectric layer between electrodes. Through a combination of these three methods, existing representative ultra-small capacitor products have their own strategy to achieve high capacity, respectively.

In the case of a multilayer ceramic capacitor (MLCC), a material having a high dielectric constant of a perovskite structure is used as a dielectric, multiple repeatedly stacked dielectric layers are connected in parallel, a distance between electrodes is closely disposed, and a thickness of the dielectric layer is thinned, thereby increasing the capacity.

In the case of a thin film silicon capacitor, the capacity may be increased by etching a silicon substrate through a semiconductor process to form a three-dimensional structure, increasing an area of an electrode, and minimizing a thickness of a dielectric through a thin film deposition process.

Meanwhile, in the case of a capacitor using a silicon substrate, since an external electrode is formed to have a shape of a ball, there is a problem of low adhesion strength when mounting. Accordingly, there is a need to develop a capacitor that has excellent ESL characteristics and may secure sufficient adhesion strength when mounted on an AP.

SUMMARY

The present disclosure has been made in an effort to provide a capacitor with excellent ESL characteristics and strong adhesion strength, and a manufacturing method thereof.

However, the objective of the present disclosure is not limited to the aforementioned one, and may be extended in various ways within the spirit and scope of the present disclosure.

An embodiment provides a capacitor including: a body including a substrate and a capacitive portion disposed on the substrate, and a first external electrode and a second external electrode disposed on the body and having a plate-shaped structure. The capacitive portion includes an insulating layer with a plurality of trenches, a first internal electrode disposed on the insulating layer and connected to the first external electrode, a dielectric layer disposed on the first internal electrode, and a second internal electrode disposed on the dielectric layer and connected to the second external electrode.

The first external electrode and the second external electrode may be disposed to face one surface of the body in which the capacitive portion is disposed.

The first external electrode and the second external electrode may be respectively disposed in corner portions of one surface of the body.

The first external electrode and the second external electrode may be disposed adjacent to each other along an edge of the body.

A plurality of first and second external electrodes may be provided, the plurality of first external electrodes may face each other in a diagonal direction of the body, and the plurality of second external electrodes may face each other in another diagonal direction of the body.

The number of the plurality of first external electrodes may be two, and the number of the plurality of second external electrodes may be two.

The insulating layer may include a silicon oxide.

Each of the first external electrode and the second external electrode may include an electrode layer disposed on one surface of the body, and a plating layer disposed on the electrode layer, and the plating layer may have a plate-shaped structure that extends to cover the electrode layer.

The electrode layer may include at least one electrode pad with a plate-shaped structure.

The substrate may include silicon (Si).

The capacitor may further include a conductive layer disposed between the substrate and the insulating layer and connected to the first internal electrode.

The capacitor may further include a via electrode portion disposed within the insulating layer and connected to the conductive layer, wherein the first external electrode may further include a first connection portion disposed on the via electrode portion to be connected to the first internal electrode.

The capacitor may further include a conductive filling portion disposed on the second internal electrode to be disposed in openings in the insulating layer where the plurality of trenches are respectively disposed.

The second external electrode may further include a second connection disposed on the conductive filling portion to be connected to the second internal electrode, the first external electrode may include a first electrode layer connected to the first connection portion, and the second external electrode may include a second electrode layer connected to at least one second connection portion.

The first external electrode may further include a third electrode layer disposed on the first electrode layer, and a third connection portion connecting the first electrode layer and the third electrode layer, and the second external electrode may further include a fourth electrode layer disposed on the second electrode layer, and a fourth connection portion connecting the second electrode layer and the fourth electrode layer.

The first electrode layer, the second electrode layer, the third electrode layer, and the fourth electrode layer may include copper (Cu).

The first external electrode may further include a first plating layer disposed on the third electrode layer, and a fifth connection portion connecting the first plating layer and the third electrode layer, and the second external electrode may further include a second plating layer disposed on the fourth electrode layer, and a sixth connection portion connecting the second plating layer and the fourth electrode layer.

Another embodiment provides a manufacturing method of a capacitor, including: forming an insulating layer on a substrate, forming a trench in the insulating layer, forming a capacitive portion by forming a first internal electrode, a dielectric layer, and a second internal electrode in the trench, forming a first external electrode connected to the first internal electrode outside the substrate and the capacitive portion and having a plate-shaped structure, and forming a second external electrode connected to the second internal electrode outside the substrate and the capacitive portion and having a plate-shaped structure.

The manufacturing method of the capacitor may further include forming a body by forming the substrate and the capacitive portion, and forming the first external electrode and the second external electrode to face one surface of the body in which the capacitive portion is disposed.

The manufacturing method of the capacitor may further include forming a body by forming the substrate and the capacitive portion, and forming the first external electrode and the second external electrode in corner portions of one surface of the body, respectively.

According to the capacitor according to the embodiment, it is possible to provide a capacitor with excellent ESL characteristics and strong adhesion strength, simplify a manufacturing process of the capacitor, and to reduce a manufacturing cost.

It is obvious that the effect of the embodiments is not limited to the above-described effect, and may be variously extended without departing from the spirit and scope of the present disclosure.

DETAILED DESCRIPTION OF THE EMBODIMENTS

Figure 1:
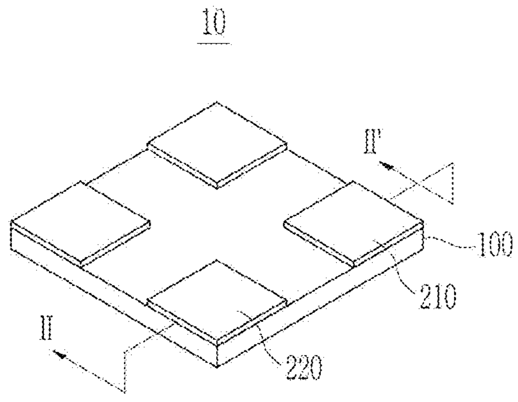
FIG. 1 illustrates a perspective view of a capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. In addition, some constituent elements are exaggerated, omitted, or briefly illustrated in the added drawings, and sizes of the respective constituent elements do not reflect the actual sizes.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Throughout this specification and the claims that follow, when it is described that an element is "coupled" to another element, the element may be "directly or physically coupled" to the other element or "indirectly coupled or non-contact coupled" to the other element through a third element.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Throughout the specification, a substrate 110 may have a structure that is wide in a plan view and thin in a cross-sectional view, and a 'planar direction of the substrate 110' may be a direction parallel to the wide and flat surface of the substrate 110, and a 'thickness direction of the substrate 110' may be a direction perpendicular to the wide and flat surface of the substrate 110.

Figure 2:
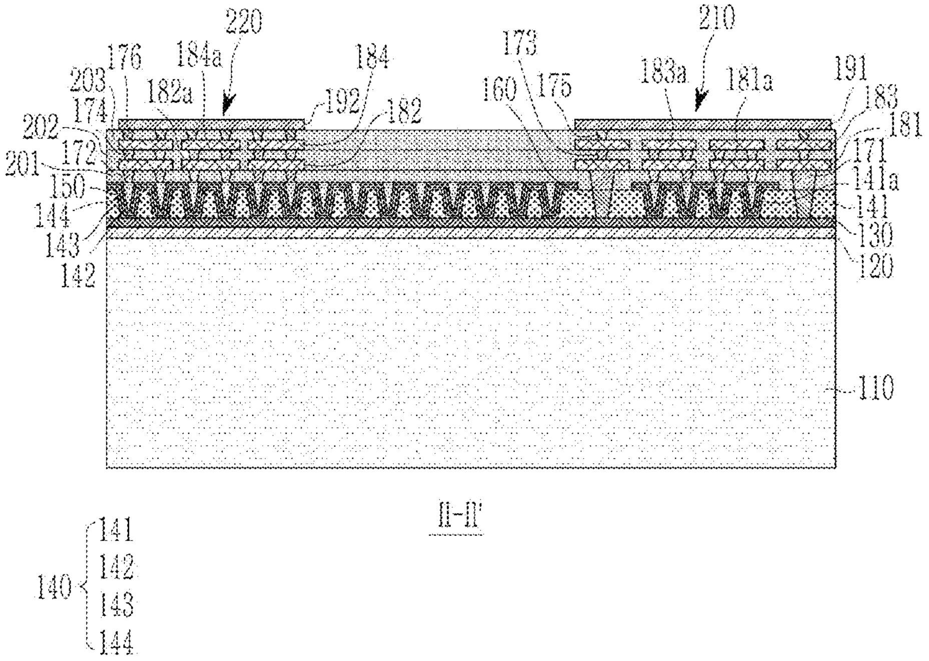
FIG. 2 illustrates a cross-sectional view of a capacitor according to an embodiment taken along line II-II' of FIG. 1.

FIG. 1 illustrates a perspective view of a capacitor according to an embodiment, and FIG. 2 illustrates a cross-sectional view of a capacitor according to an embodiment taken along line II-II' of FIG. 1.

Referring to FIG. 1 and FIG. 2, a capacitor 10 according to an embodiment may include a body 100 including a substrate 110 and a capacitive portion 140 disposed on the substrate 110, and a first external electrode 210 and a second external electrode 220 disposed on the body 100 and having a plate-shaped structure. A thickness of the capacitor 10 according to the thickness direction of the substrate 110 may be in the range of 65 μm or less.

There is no particular limitation on the shape of the body 100, but it may generally have a hexahedral shape. The body 100 may include the substrate 110, and a first insulating layer 120, a conductive layer 130, a capacitive portion 140, and a filling portion 150 sequentially stacked on the substrate 110. In addition, the body 100 may include a via electrode portion 160 penetrating a second insulating layer 141.

The substrate 110 may have a predetermined area. The substrate 110 is made of an insulating material. As an example, the substrate 110 may be a silicon substrate including silicon (Si).

The first insulating layer 120 may be disposed on the substrate 110. The first insulating layer 120 may have a predetermined thickness. The first insulating layer 120 may include a silicon oxide ($SiO_x$). For example, the first insulating layer 120 may include $SiO_2$.

The conductive layer 130 may be disposed on the first insulating layer 120. The conductive layer 130 may be made of a metallic material. For example, the conductive layer 130 may include TiN.

The capacitive portion 140 may be disposed on the substrate 110. The capacitive portion 140 may be disposed on the conductive layer 130. The capacitive portion 140 may include the second insulating layer 141, a first internal electrode 142, a dielectric layer 143, and a second internal electrode 144.

The second insulating layer 141 may be disposed on the substrate 110. The second insulating layer 141 may be disposed on the conductive layer 130. The conductive layer 130 may be disposed between the substrate 110 and the second insulating layer 141. The second insulating layer 141 may have a predetermined thickness. For example, the thickness of the second insulating layer 141 may be 1.8 um to 2.2 um. The second insulating layer 141 may include a silicon oxide (SiOx).

A plurality of trenches **141*a* that penetrate into the inside of the second insulating layer 141 from one surface of the second insulating layer 141 may be disposed in the second insulating layer 141. The trench 141*a* may be formed by etching one surface of the second insulating layer 141. A lower end of the trench 141*a* may be connected to the conductive layer 130. That is, before the trench 141*a* is filled, the conductive layer 130 may be exposed to the outside through the trench 141*a*. The trench 141*a*** may be formed long in one direction or may be formed at intervals.

The first internal electrode 142 may be disposed on the second insulating layer 141 in the area in which the trench **141*a* is formed. That is, the first internal electrode 142 may be disposed on the trench 141*a*. In addition, the first internal electrode 142 may be disposed on the second insulating layer 141 between the trenches 141*a* adjacent to each other. The first internal electrode 142 may be formed using a conductive material. The first internal electrode 142 may be made of a metallic material. The first internal electrode 142 may be connected to the conductive layer 130. The first internal electrode 142 has a structure that directly contacts the conductive layer 130, and may be connected to the conductive layer 130**.

The first internal electrode 142 may be formed using a chemical vapor deposition (CVD) process or an atomic layer deposition (ALD) process, but is not limited thereto.

The dielectric layer 143 may be disposed on the first internal electrode 142. That is, the dielectric layer 143 may be disposed on the first internal electrode 142 of the trench **141*a*. In addition, the dielectric layer 143 may be disposed on the first internal electrode 142 between the trenches 141*a* adjacent to each other. The dielectric layer 143 may be formed as ZAZ, a composite layer of $ZrO_2$—$Al_2O_3$—$ZrO_2$. Alternatively, the dielectric layer 143 may be made of one of oxide metals such as $Al_2O_3$, $ZrO_2$, and $HfO_2$. In addition, the dielectric layer 143** may be made of a combination of oxide metals such as $Al_2O_3$, $ZrO_2$, and $HfO_2$.

The dielectric layer 143 may be formed using a chemical vapor deposition process or an atomic layer deposition process, but is not limited thereto.

The second internal electrode 144 may be disposed on the dielectric layer 143. That is, the second internal electrode 144 may be disposed on the dielectric layer 143 of the trench **141*a*. In addition, the second internal electrode 144 may be disposed on the dielectric layer 143 between the trenches 141*a* adjacent to each other. The second internal electrode 144 may be formed using a conductive material. The second internal electrode 144 may be made of a metallic material. The second internal electrode 144 faces the first internal electrode 142 with the dielectric layer 143 therebetween. The first internal electrode 142 and the second internal electrode 144 are disposed to face each other with the dielectric layer 143 therebetween, and may operate as a capacitor when voltages of different polarities are applied to the first internal electrode 142 and the second internal electrode 144**.

The second internal electrode 144 may be formed using a chemical vapor deposition process or an atomic layer deposition process, but is not limited thereto.

When the first internal electrode 142, the dielectric layer 143, and the second internal electrode 144 are disposed in the trench **141*a*, a space may be formed in the center of the trench 141*a*. The space may cause cracks to occur in the capacitive portion 140. Accordingly, the first internal electrode 142, the dielectric layer, and the second internal electrode 144 may be disposed on the trench 141*a*, and the filling portion 150 may be disposed in the remaining space. The filling portion 150 may be disposed on the second internal electrode 144 to fill the opening of the second insulating layer 141 caused by the plurality of trenches 141*a*. The filling portion 150 may be formed using a conductive material. The filling portion 150 may be made of a metallic material. The filling portion 150 may include $TiN_x$. For example, the filling portion 150** may include TiN.

The via electrode portion 160 may be disposed within the second insulating layer 141. The via electrode portion 160 may be disposed on one side of the trench **141*a*. The via electrode portion 160 may have a shape in which a conductive material is filled inside a via disposed to penetrate the second insulating layer 141. For example, the via electrode portion 160 may include Cu. The via electrode portion 160 may be connected to the conductive layer 130. The via electrode portion 160 has a structure that directly contacts the conductive layer 130, and may be connected to the conductive layer 130**.

The first external electrode 210 and the second external electrode 220 may be disposed on one surface of the body 100. The first external electrode 210 and the second external electrode 220 may be disposed to face one surface of the body 100 in which the capacitive portion 140 is disposed. The first external electrode 210 and the second external electrode 220 may be disposed in a corner area of one surface of the body 100.

The first external electrode 210 and the second external electrode 220 may be disposed adjacent to each other along the edge of the body 100. In other words, the first external electrode 210 and the second external electrode 220 may be alternately disposed along the circumference of one surface of the body facing the first external electrode 210 and the second external electrode 220.

A plurality of first and second external electrodes 210 and 220 may be provided. The plurality of first external electrodes 210 may be disposed to face each other in one diagonal direction of the body 100. The plurality of second external electrodes may be disposed to face each other in the other diagonal direction of the body. For example, when the body 100 has a hexahedral shape, two first external electrodes 210 facing in one diagonal direction and two second external electrodes 220 facing in the other diagonal direction may be disposed in four corner areas of one surface of the body.

The first external electrode 210 and the second external electrode 220 may have a quadrangular planar shape. However, they are not limited thereto, and may have a planar shape such as a circular shape or a polygonal shape. A length of one side of each of the first external electrode 210 and the second external electrode 220 in a plan view may be in the range of 0.15 mm or more and 0.25 mm or less. A distance between adjacent external electrodes of the first external electrode 210 and the second external electrode 220 may be 0.1 mm or more.

At least a portion of the first external electrode 210 and the second external electrode 220 may be embedded in a third insulating layer 201, a fourth insulating layer 202, and a fifth insulating layer 203. For example, the third insulating layer 201, the fourth insulating layer 202, and the fifth insulating layer 203 may be sequentially laminated.

The third insulating layer 201 may be disposed on the second insulating layer 141. The third insulating layer 201 may be disposed on the capacitive portion 140. The third insulating layer 201 may be disposed on the filling portion 150. The third insulating layer 201 may include a silicon oxide (SiOx). The fourth insulating layer 202 may be disposed on the third insulating layer 201. The fourth insulating layer 202 may include silicon oxide (SiOx). The fifth insulating layer 203 may be disposed on the fourth insulating layer 202. The fifth insulating layer 203 may include silicon oxide (SiOx).

The first external electrode 210 may include a first connection portion 171, a first electrode layer 181, a third connection portion 173, a third electrode layer 183, a fifth connection portion 175, and a first plating layer 191.

The first external electrode 210 may be electrically connected to the first internal electrode 142. The first external electrode 210 may include the first connection portion 171 connected to the via electrode portion 160. The first connection portion 171 may penetrate the third insulating layer 201. The first connection portion 171 may be disposed on the via electrode portion 160. The first connection portion 171 may directly contact the via electrode portion 160. The first connection portion 171 may be connected to the first internal electrode 142.

The first electrode layer 181 may be disposed on one surface of the body 100. The first electrode layer 181 may be disposed on the third insulating layer 201. The first electrode layer 181 may be connected to the first connection portion 171. The first electrode layer 181 may be disposed on the first connection portion 171. The first electrode layer 181 may be in direct contact with the first connection portion 171. The first electrode layer 181 may be connected to the first connection portion 171, or to at least one second connection portion 172, which will be described later. The first electrode layer 181 may include at least one electrode pad 181*a* having a plate-shaped structure. For example, the first electrode layer 181 may include copper (Cu).

The third electrode layer 183 may be disposed on the first electrode layer 181. The third electrode layer 183 may be disposed on the fourth insulating layer 202. The third electrode layer 183 may be connected to the third connection portion 173. The third connection portion 173 may connect the first electrode layer 181 and the third electrode layer 183. The third connection portion 173 may penetrate the fourth insulating layer 202. The third electrode layer 183 may be disposed on the third connection portion 173. The third electrode layer 183 may be in direct contact with the third connection portion 173. The third electrode layer 183 may be connected to at least one third connection portion 173. The third electrode layer 183 may include at least one electrode pad 183*a* having a plate-shaped structure. Here, the number of the electrode pads 183*a* configuring the third electrode layer 183 may be the same as or less than the number of the electrode pads 181*a* configuring the first electrode layer 181. For example, the third electrode layer 183 may include Cu. For example, the thickness from the body 100 to the third electrode layer 183 along the thickness direction of the substrate 110 may be in the range of 7 μm or more and 8 μm or less.

The first plating layer 191 may be disposed on the third electrode layer 183. The first plating layer 191 may be disposed on the fifth insulating layer 203. The first plating layer 191 may be connected to the fifth connection portion 175. The fifth connection portion 175 may connect the first plating layer 191 and the third electrode layer 183. The fifth connection portion 175 may penetrate the fifth insulating layer 203. The first plating layer 191 may be disposed on the fifth connection portion 175. The first plating layer 191 may be in direct contact with the fifth connection portion 175. The first plating layer 191 may be connected to at least one fifth connection portion 175. The first plating layer 191 may include an electrode pad having a plate-shaped structure. The first plating layer 191 may have a plate-shaped structure. The first plating layer 191 may have a plate-shaped structure extending to cover the first electrode layer 181 and the third electrode layer 183. The first plating layer 191 may overlap the first electrode layer 181 and the third electrode layer 183 in the thickness direction of the substrate 110. For example, the first plating layer 191 may include at least one of aluminum (Al), nickel (Ni), tin (Sn), and silver (Ag).

In FIG. 1, the plating layer is shown as one layer, but the present disclosure is not limited thereto, and the connection portion and the plating layer may be further disposed on the first plating layer 191. For example, the thickness from the third electrode layer 183 to the first plating layer 191 along the thickness direction of the substrate 110 may be 2 μm or more and 7.5 μm or less. Specifically, when the plating layer is one layer, the thickness from the third electrode layer 183 to the plating layer along the thickness direction of the substrate 110 may be in the range of 2 μm or more and 3 μm or less. In addition, when the plating layer is two layers, the thickness from the third electrode layer 183 to the plating layer along the thickness direction of the substrate 110 may be in the range of 5.5 μm or more and 7.5 μm or less. Here, the thickness from the third electrode layer 183 to the adjacent plating layer along the thickness direction of the substrate 110 may be 2 μm or more and 3 μm or less, and the thickness from the lower plating layer to the upper plating layer along the thickness direction of the substrate 110 may be in the range of 3.5 μm or more and 4.5 μm or less.

The second external electrode 220 may include a second connection portion 172, a second electrode layer 182, a fourth connection portion 174, a fourth electrode layer 184, a sixth connection portion 176, and a second plating layer 192.

The second external electrode 220 may be electrically connected to the second internal electrode 144. The second external electrode 220 may include the second connection portion 172 connected to the filling portion 150. The second connection portion 172 may penetrate the third insulating layer 201. The second connection portion 172 may be disposed on the filling portion 150. The second connection portion 172 may be in direct contact with the filling portion 150. The second connection portion 172 may be connected to the second internal electrode 144.

The second electrode layer 182 may be disposed on one surface of the body 100. The second electrode layer 182 may be disposed on the third insulating layer 201. The second electrode layer 182 may be connected to the second connection portion 172. The second electrode layer 182 may be disposed on the second connection portion 172. The second electrode layer 182 may be in direct contact with the second connection portion 172. The second electrode layer 182 may be connected to at least one second connection portion 172. The second electrode layer 182 may include at least one electrode pad 182*a* having a plate-shaped structure. For example, the second electrode layer 182 may include copper (Cu).

The fourth electrode layer 184 may be disposed on the second electrode layer 182. The fourth electrode layer 184 may be disposed on the fourth insulating layer 202. The fourth electrode layer 184 may be connected to the fourth connection portion 174. The fourth connection portion 174 may connect the second electrode layer 182 and the fourth electrode layer 184. The fourth connection portion 174 may penetrate the fourth insulating layer 202. The fourth electrode layer 184 may be disposed on the fourth connection portion 174. The fourth electrode layer 184 may be in direct contact with the fourth connection portion 174. The fourth electrode layer 184 may be connected to at least one fourth connection portion 174. The fourth electrode layer 184 may include at least one electrode pad 184*a* having a plate-shaped structure. Here, the number of the electrode pads 184*a* configuring the fourth electrode layer 184 may be the same as or less than the number of the electrode pads 182*a* configuring the second electrode layer 182. For example, the fourth electrode layer 184 may include Cu. For example, the thickness from the body 100 to the fourth electrode layer 184 along the thickness direction of the substrate 110 may be in the range of 7 μm or more and 8 μm or less.

The second plating layer 192 may be disposed on the fourth electrode layer. The second plating layer 192 may be disposed on the fifth insulating layer 203. The second plating layer 192 may be connected to the sixth connection portion 176. The sixth connection portion 176 may connect the second plating layer 192 and the fourth electrode layer 184. The sixth connection portion 176 may penetrate the fifth insulating layer 203. The second plating layer 192 may be disposed on the sixth connection portion 176. The second plating layer 192 may be in direct contact with the sixth connection portion 176. The second plating layer 192 may be connected to at least one sixth connection portion 176. The second plating layer 192 may include an electrode pad having a plate-shaped structure. The second plating layer 192 may have a plate-shaped structure. The second plating layer 192 may have a plate-shaped structure that extends to cover the second electrode layer 182 and the fourth electrode layer 184. The second plating layer 192 may overlap the second electrode layer 182 and the fourth electrode layer 184 in the thickness direction of the substrate 110.

For example, the second plating layer 192 may include at least one of Al, Ni, Sn, and Ag.

In FIG. 1, the plating layer is shown as one layer, but the present disclosure is not limited thereto, and the connection portion and the plating layer may be further disposed on the second plating layer 192. For example, the thickness from the fourth electrode layer 184 to the second plating layer 192 along the thickness direction of the substrate 110 may be 2 μm or more and 7.5 μm or less. Specifically, when the plating layer is one layer, the thickness from the fourth electrode layer 184 to the plating layer along the thickness direction of the substrate 110 may be in the range of 2 μm or more and 3 μm or less. In addition, when the plating layer is two layers, the thickness from the fourth electrode layer 184 to the plating layer along the thickness direction of the substrate 110 may be in the range of 5.5 μm or more and 7.5 μm or less. Here, the thickness from the fourth electrode layer 184 to the adjacent plating layer along the thickness direction of the substrate 110 may be 2 μm or more and 3 μm or less, and the thickness from the lower plating layer to the upper plating layer along the thickness direction of the substrate 110 may be in the range of 3.5 μm or more and 4.5 μm or less.

As described above, by disposing the external electrode in the corner area of the body and forming the external electrode to have a plate-shaped structure, a capacitor with excellent ESL characteristics and strong adhesion strength may be provided.

Hereinafter, a manufacturing method of the capacitor 10 according to the embodiment will be described with reference to FIG. 3 to FIG. 10. FIG. 3 to FIG. 10 illustrate a manufacturing method of a capacitor according to an embodiment.

Figure 3:
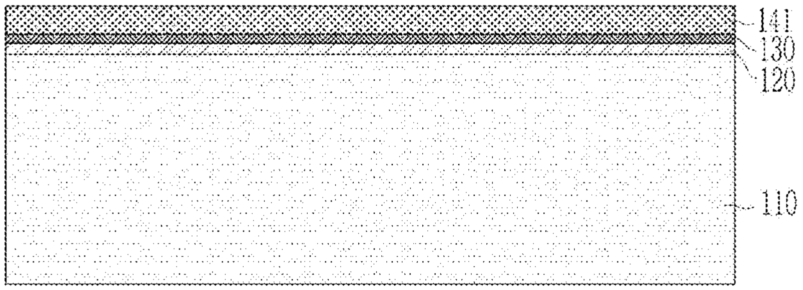
FIG. 3 to FIG. 10 illustrate a manufacturing method of a capacitor according to an embodiment.

Referring to FIG. 3, the first insulating layer 120, the conductive layer 130, and the second insulating layer 141 may be sequentially formed on the substrate 110. The first insulating layer 120, the conductive layer 130, and the second insulating layer 141 may be formed through a deposition process. Chemical vapor deposition (CVD), atomic layer deposition (ALD), and the like may be used to form the first insulating layer 120 and the second insulating layer 141. Chemical vapor deposition, atomic layer deposition, and the like may be used to form the conductive layer 130.

Figure 4:
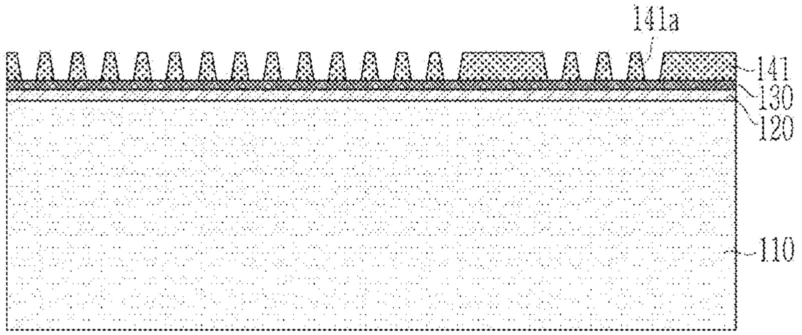

Referring to FIG. 4, the trench 141*a* is formed in the second insulating layer 141. The trench 141*a* may be formed through an etching process. The etching process may be performed using a mask. The mask may be formed through photo resist.

Figure 5:
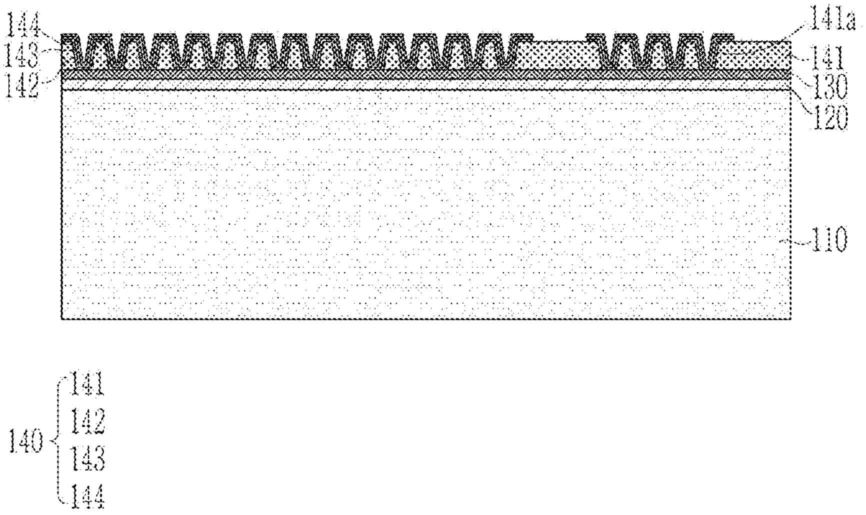

Referring to FIG. 5, a capacitive portion 140 is formed on the substrate 110. Specifically, the first internal electrode 142 is formed on the second insulating layer 141. The first internal electrode 142 may be formed through a deposition process. Chemical vapor deposition, atomic layer deposition, and the like may be used for deposition of the first internal electrode 142.

The dielectric layer 143 may be formed on the first internal electrode 142. The dielectric layer 143 may be formed through a deposition process. Chemical vapor deposition, atomic layer deposition, and the like may be used for deposition of the dielectric layer 143.

The second internal electrode 144 may be formed on the dielectric layer 143. The second internal electrode 144 may be formed through a deposition process. Chemical vapor deposition, atomic layer deposition, and the like may be used for deposition of the second internal electrode 144.

Figure 6:
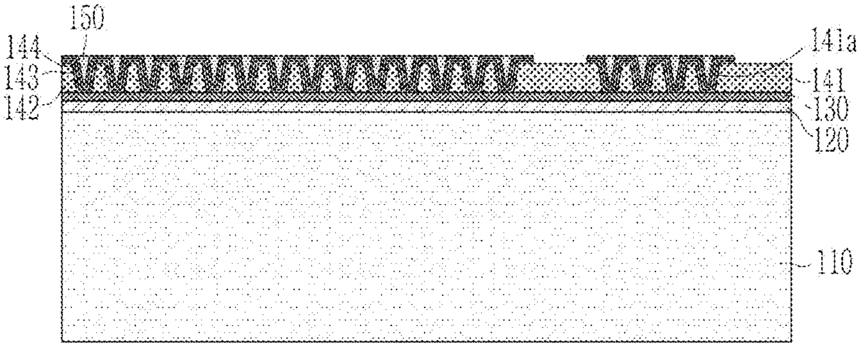

Referring to FIG. 6, the filling portion 150 may be formed on the second internal electrode 144. The filling portion 150 may be formed to fill the opening of the second insulating layer 141 caused by the plurality of trenches 141*a*. The filling portion 150 may be formed to fill the remaining space after the first internal electrode 142, the dielectric layer 143, and the second internal electrode 144 are disposed on the trench 141*a* of the second insulating layer 141.

Figure 7:
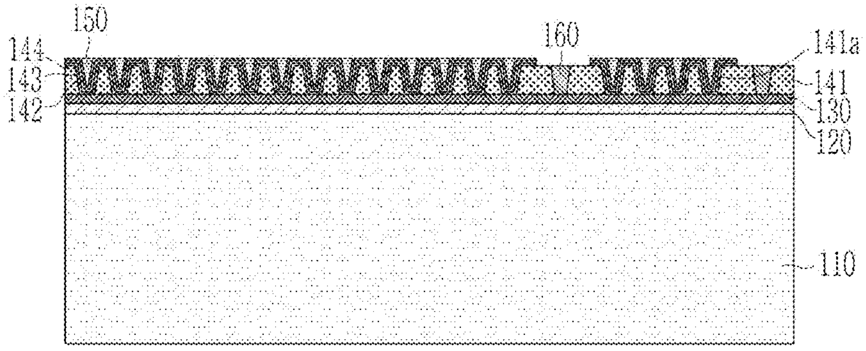

Referring to FIG. 7, the via electrode portion 160 penetrating the second insulating layer 141 may be formed. The via electrode portion 160 may be formed by forming a via that penetrates the second insulating layer 141 and filling the inside of the via with a conductive material.

The body 100 may be formed by forming the first insulating layer 120, the conductive layer 130, the capacitive portion, the filling portion 150, and the via electrode portion 160 on the substrate 110.

Hereinafter, the first external electrode 210 may be formed on the outside of the substrate 110 and the capacitive portion 140 to be electrically connected to the first internal electrode 142 and have a plate-shaped structure. In addition, the second external electrode 220 may be formed on the outside of the substrate 110 and the capacitive portion 140 to be electrically connected to the second internal electrode 144 and have a plate-shaped structure.

The first external electrode 210 and the second external electrode 220 may be formed to face one surface of the body 100 in which the capacitive portion 140 is disposed. The first external electrode 210 and the second external electrode 220 may be formed in a corner area of one surface of the body.

Figure 8:
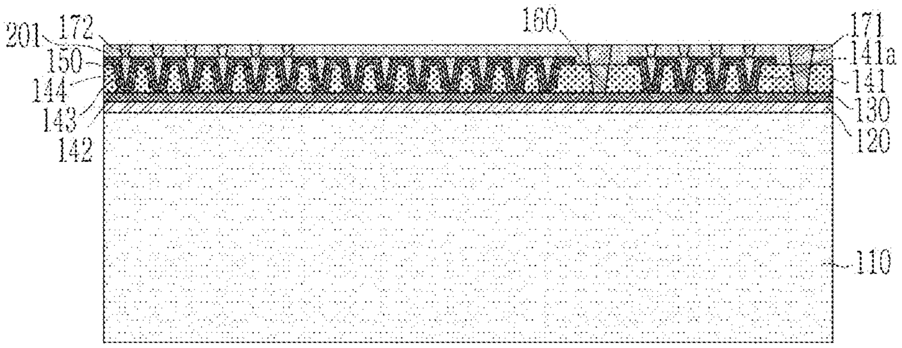

Referring to FIG. 8, through a bump forming process, the first connection portion 171 may be formed on the via electrode portion 160, and the second connection portion 172 may be formed on the filling portion 150. The first connection portion 171 may be formed by forming a via that penetrates a part of the third insulating layer 201 and filling the inside of the via with a conductive material. In one example, the first connection portion 171 and the via electrode portion 160 can be formed together by forming a via that penetrates both the second insulating layer 141 and the third insulating layer 201 and filling the inside of the via with a conductive material. The second connection portion 172 may be formed by forming a via that penetrates another part of the third insulating layer 201 and filling the inside of the via with a conductive material.

Figure 9:
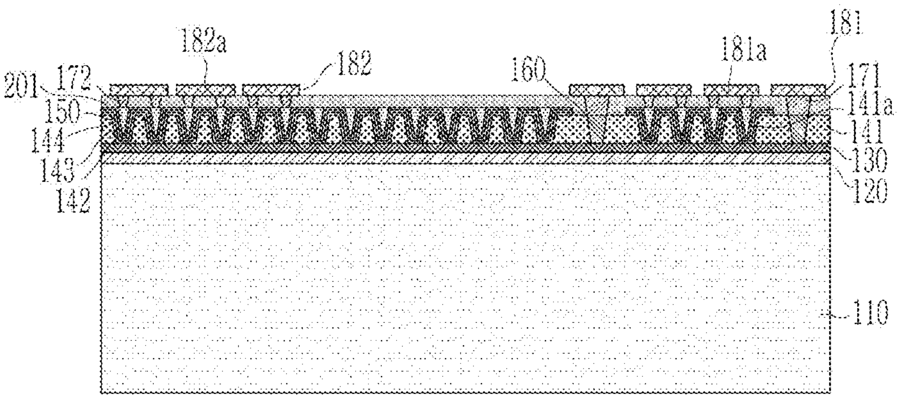

Referring to FIG. 9, the first electrode layer 181 may be formed on the first connection portion 171, and the second electrode layer 182 may be formed on the second connection portion. The first electrode layer 181 may be formed on the third insulating layer 201. The second electrode layer 182 may be formed on the third insulating layer 201. The first electrode layer 181 and the second electrode layer 182 may be formed through a deposition process. The first electrode layer 181 and the second electrode layer 182 may be formed by separate deposition through a mask. The first electrode layer 181 may be formed to include at least one electrode pad 181*a* having a plate-shaped structure. In addition, the second electrode layer 182 may be formed to include at least one electrode pad 182*a* having a plate-shaped structure.

Figure 10:
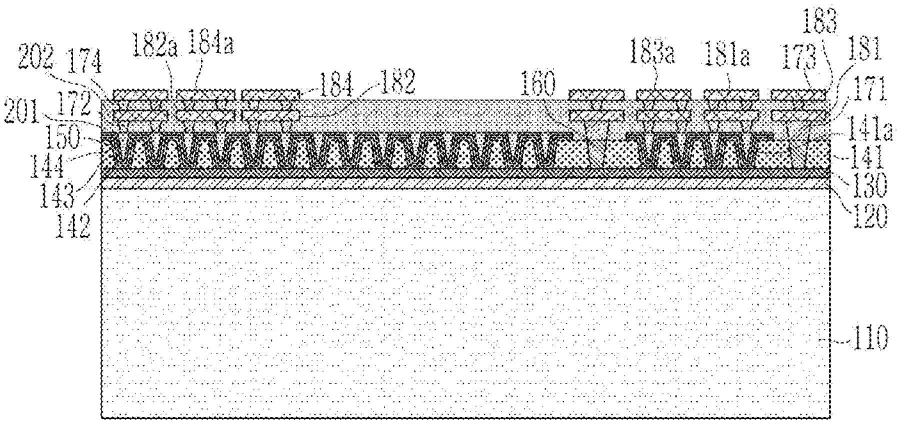

Referring to FIG. 10, the third connection portion 173 may be formed on the first electrode layer 181, and the fourth connection portion 174 may be formed on the second electrode layer 182. The third connection portion 173 may be formed by forming a via that penetrates a part of the fourth insulating layer 202 and filling the inside of the via with a conductive material. The fourth connection portion 174 may be formed by forming a via that penetrates another part of the third insulating layer 201 and filling the inside of the via with a conductive material.

In addition, the third electrode layer 183 may be formed on the third connection portion 173, and the fourth electrode layer 184 may be formed on the fourth connection portion 174. The third electrode layer 183 may be formed on the fourth insulating layer 202. The fourth electrode layer 184 may be formed on the fourth insulating layer 202. The third connection portion 173 and the fourth connection portion 174 may be formed through a bump formation process. The third electrode layer 183 and the fourth electrode layer 184 may be formed through a deposition process. The third electrode layer 183 and the fourth electrode layer 184 may be formed by separate deposition through a mask. The third electrode layer 183 may be formed to include at least one electrode pad 183*a* having a plate-shaped structure. In addition, the fourth electrode layer 184 may be formed to include at least one electrode pad 184*a* having a plate-shaped structure.

The fifth connection portion 175 may be formed on the third electrode layer 183, and the sixth connection portion 176 may be formed on the fourth electrode layer 184. The fifth connection portion 175 may be formed by forming a via that penetrates a part of the fifth insulating layer 203 and filling the inside of the via with a conductive material. The sixth connection portion 176 may be formed by forming a via that penetrates another part of the fifth insulating layer 203 and filling the inside of the via with a conductive material.

In addition, the first plating layer 191 may be formed on the fifth connection portion 175, and the second plating layer 192 may be formed on the sixth connection portion 176. The first plating layer 191 may be formed on the fifth insulating layer 203. The second plating layer 192 may be formed on the fifth insulating layer 203. Accordingly, the capacitor 10 according to the embodiment shown in FIG. 1 and FIG. 2 may be formed. The first plating layer 191 and the second plating layer 192 may be formed through a plating process. The first plating layer 191 may be formed to have a plate-shaped structure that extends to cover the first electrode layer 181 and the third electrode layer 183. In addition, the second plating layer 192 may be formed to have a plate-shaped structure that extends to cover the second electrode layer 182 and the fourth electrode layer 184.

As described above, by disposing the external electrode in the corner area of the body and forming the external electrode to have a plate-shaped structure, a capacitor with excellent ESL characteristics and strong adhesion strength may be provided.

Figure 11:
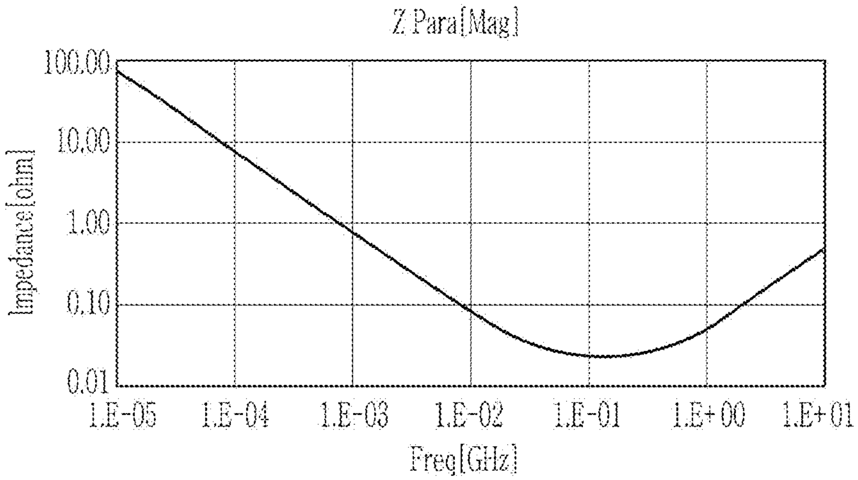
FIG. 11 illustrates an impedance simulation result of a capacitor according to an embodiment.
Figure 12:
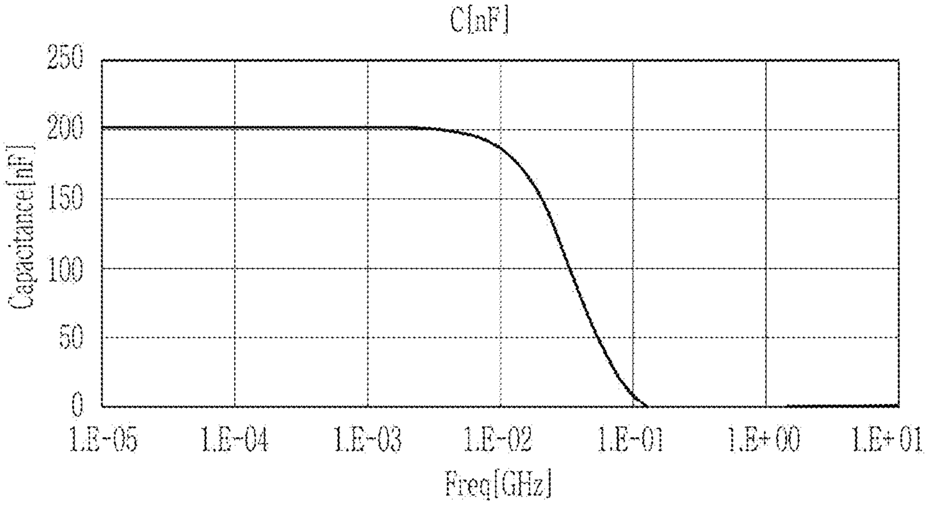
FIG. 12 illustrates a capacitance simulation result of a capacitor according to an embodiment.
Figure 13:
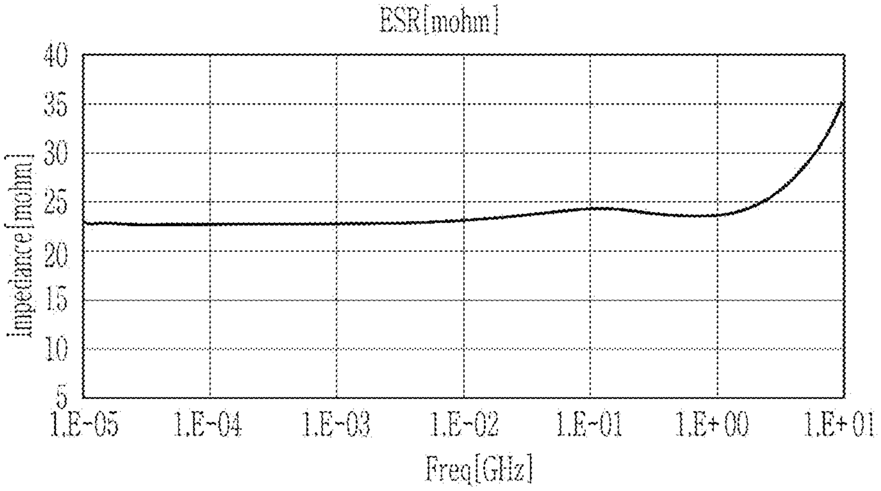
FIG. 13 illustrates an ESR simulation result of a capacitor according to an embodiment.
Figure 14:
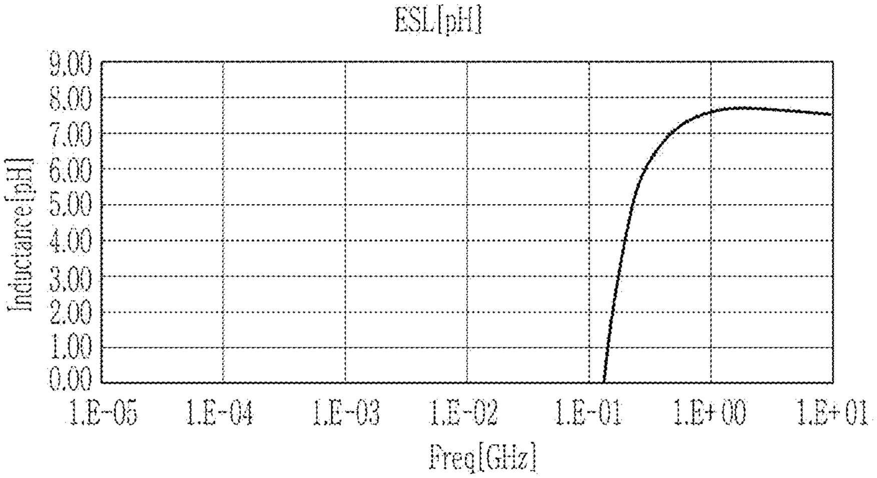
FIG. 14 illustrates an ESL simulation result of a capacitor according to an embodiment.

Hereinafter, simulation results for the characteristics of the capacitor 10 according to the embodiment will be described with reference to FIG. 11 to FIG. 14. FIG. 11 illustrates an impedance simulation result of a capacitor according to an embodiment, FIG. 12 illustrates a capacitance simulation result of a capacitor according to an embodiment, FIG. 13 illustrates an ESR simulation result of a capacitor according to an embodiment, and FIG. 14 illustrates an ESL simulation result of a capacitor according to an embodiment.

Capacity and DF were measured using a capacitance meter (E4981A) under the conditions of frequency 120 to 1 MHZ, AC voltage 0.1 to 1.0 Vrms, and measurement mode Cp-D.

Using a high resistance meter (B2985B), the insulation resistance was measured after leaving it for 120 seconds with the current limit set at Rated Voltage (about 1.5 v).

Equivalent serial resistance (ESR) and equivalent series induction (ESL) were measured under the conditions of frequency 100 kHz to 6 GHz and input power 13 dBm or less (1 Vrms) using a network analyzer (E5061B).

Referring to FIG. 11, it can be seen that the capacitor 10 according to the embodiment has an impedance of 1.00 ohm in the section after frequency 1.E-01, which may be a lower value compared to a ceramic capacitor whose body is formed using a ceramic material.

Referring to FIG. 12, it can be seen that the capacitance of the capacitor 10 according to the embodiment may have a value of up to 200 nF.

Referring to FIG. 13, it can be seen that the ESR of the capacitor 10 according to the embodiment has a value of 35 mohm or less. Considering that a ceramic capacitor may have a value of 40 mohm or more, it can be seen that the ESR of the capacitor 10 according to the embodiment may have a lower value.

Referring to FIG. 14, it can be seen that the ESL of the capacitor 10 according to the embodiment has a value of 8 pH or less. Considering that a ceramic capacitor may have a value of about 20 pH, it can be seen that the ESL of the capacitor 10 according to the embodiment may have a lower value.

Table 1 below shows the results of simulating the adhesion strength according to the shape of the external electrode and the material of the capacitor when mounting the capacitor on the lower surface of the AP.

Table

In Table 1, the size may mean the length and width of the capacitor.

TABLE 1

| | Example | Comparative Example 1 | Comparative Example 2 |
|---|---|---|---|
| Size (mm × mm) | 0.6 mm × 0.6 mm | 0.48 mm × 0.48 mm | 0.6 mm × 0.6 mm |
| Type of external electrode | Lower surface | Side surface and band | Ball |
| Material | Silicon | Ceramic | Silicon |
| Entire area of external electrode ($mm^2$) | 0.1600 | 0.1024 | 0.0340 |
| Adhesion strength | 0.1024 | 0.1024 | 0.02176 |
| Presence of underfill | No | No | Yes |

Referring to Table 1, it can be seen that the adhesion strength of the capacitor 10 according to the example is 0.1024. The adhesion strength may be obtained by multiplying the entire area of the external electrode by a specific coefficient. Here, in the case of the side surface and band-shaped external electrode of Comparative Example 1, the coefficient may be 1, and in the case of the electrode of the lower of the example and the ball-shaped external electrode of Comparative Example 2, the coefficient may be 0.64. Through the adhesion strength, it can be seen that, like the ceramic capacitor with a size of 0.48 mm×0.48 mm in Comparative Example 1, the capacitor 10 according to the example may be mounted on the AP without a separate underfill process. Accordingly, according to the capacitor 10 according to the embodiment, the manufacturing process of the capacitor may be simplified and the manufacturing cost thereof may be reduced.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A capacitor comprising:

a body including a substrate and a capacitive portion disposed on the substrate; and a first external electrode and a second external electrode disposed on the body and having a plate-shaped structure, wherein the capacitive portion includes:

an insulating layer with a plurality of trenches including first trenches covered by the first external electrode and second trenches covered by the second external electrode;

a first internal electrode disposed at least in the plurality of trenches in the insulating layer and connected to the first external electrode;

a dielectric layer disposed on the first internal electrode at least in the plurality of trenches; and a second internal electrode disposed on the dielectric layer at least in the plurality of trenches and connected to the second external electrode.

2. The capacitor of claim 1, wherein the first external electrode and the second external electrode are disposed to face one surface of the body in which the capacitive portion is disposed.

3. The capacitor of claim 1, wherein the first external electrode and the second external electrode are respectively disposed in corner portions of one surface of the body.

4. The capacitor of claim 3, wherein the first external electrode and the second external electrode are disposed adjacent to each other along an edge of the body.

5. The capacitor of claim 3, wherein a plurality of first and second external electrodes are provided, the plurality of first external electrodes face each other in a diagonal direction of the body, and the plurality of second external electrodes face each other in another diagonal direction of the body.

6. The capacitor of claim 5, wherein the number of the plurality of first external electrodes is two, and the number of the plurality of second external electrodes is two.

7. The capacitor of claim 1, wherein the insulating layer includes a silicon oxide.

8. The capacitor of claim 1, wherein each of the first external electrode and the second external electrode includes:

an electrode layer disposed on one surface of the body; and a plating layer disposed on the electrode layer, and the plating layer has a plate-shaped structure that extends to cover the electrode layer.

9. The capacitor of claim 8, wherein the electrode layer includes at least one electrode pad with a plate-shaped structure.

10. The capacitor of claim 1, wherein the substrate includes silicon (Si).

11. The capacitor of claim 1, further comprising: a conductive layer disposed between the substrate and the insulating layer and connected to the first internal electrode.

12. A capacitor comprising:

a body including a substrate and a capacitive portion disposed on the substrate; and a first external electrode and a second external electrode disposed on the body and having a plate-shaped structure, wherein the capacitive portion includes:

an insulating layer with a plurality of trenches:

a first internal electrode disposed on the insulating layer and connected to the first external electrode;

a dielectric layer disposed on the first internal electrode; and a second internal electrode disposed on the dielectric layer and connected to the second external electrode, the capacitor further comprises:

a conductive layer disposed between the substrate and the insulating layer and connected to the first internal electrode; and a via electrode portion disposed within the insulating layer and connected to the conductive layer, and the first external electrode further includes a first connection portion disposed on the via electrode portion to be connected to the first internal electrode.

13. The capacitor of claim 12, further comprising: a conductive filling portion disposed on the second internal electrode to be disposed in openings in the insulating layer where the plurality of trenches are respectively disposed.

14. The capacitor of claim 13, wherein the second external electrode further includes:

a second connection disposed on the conductive filling portion to be connected to the second internal electrode, the first external electrode includes a first electrode layer connected to the first connection portion, and the second external electrode includes a second electrode layer connected to at least one second connection portion.

15. The capacitor of claim 14, wherein the first external electrode further includes:

a third electrode layer disposed on the first electrode layer; and a third connection portion connecting the first electrode layer and the third electrode layer, and the second external electrode further includes:

a fourth electrode layer disposed on the second electrode layer; and a fourth connection portion connecting the second electrode layer and the fourth electrode layer.

16. The capacitor of claim 15, wherein the first electrode layer, the second electrode layer, the third electrode layer, and the fourth electrode layer include copper (Cu).

17. The capacitor of claim 15, wherein the first external electrode further includes:

a first plating layer disposed on the third electrode layer; and a fifth connection portion connecting the first plating layer and the third electrode layer, and the second external electrode further includes:

a second plating layer disposed on the fourth electrode layer; and a sixth connection portion connecting the second plating layer and the fourth electrode layer.

18. A manufacturing method of a capacitor, comprising:

forming an insulating layer on a substrate;

forming a plurality of trenches in the insulating layer;

forming a capacitive portion by forming a first internal electrode, a dielectric layer, and a second internal electrode at least in the plurality of trenches;

forming a first external electrode covering first trenches among the plurality of trenches and connected to the first internal electrode outside the substrate and the capacitive portion and having a plate-shaped structure; and forming a second external electrode covering second trenches among the plurality of trenches and connected to the second internal electrode outside the substrate and the capacitive portion and having a plate-shaped structure.

19. The manufacturing method of the capacitor of claim 18, further comprising:

forming a body by forming the substrate and the capacitive portion; and forming the first external electrode and the second external electrode to face one surface of the body in which the capacitive portion is disposed.

20. The manufacturing method of the capacitor of claim 18, further comprising:

forming a body by forming the substrate and the capacitive portion; and forming the first external electrode and the second external electrode in corner portions of one surface of the body, respectively.

* * * * *